Patented Jan. 27, 1953

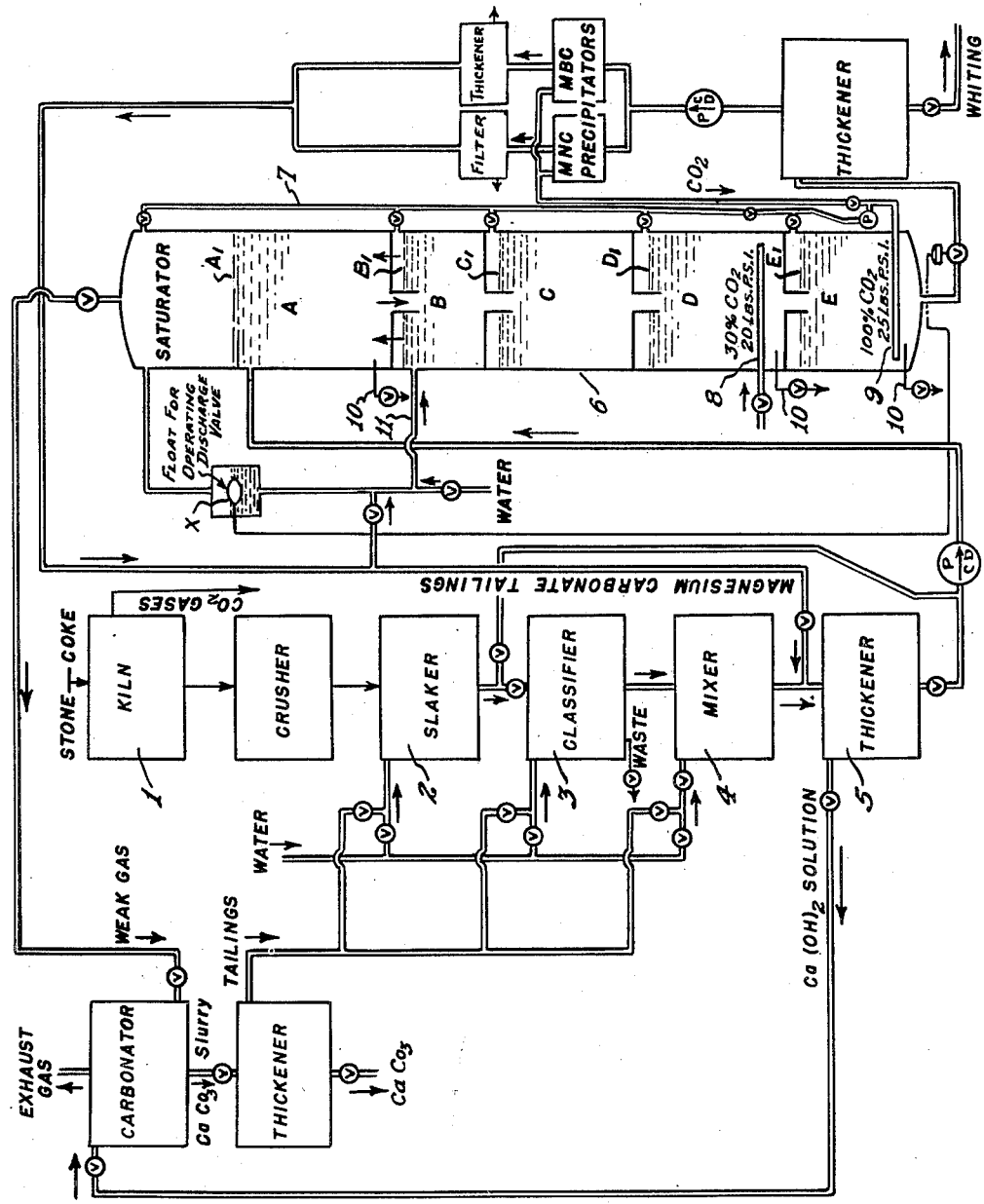

2,626,853

UNITED STATES PATENT OFFICE 2,626,853

SELECTIVE CARBONATION OF SLURRIES AND MIXTURES OF CALCIUM AND MAGNESIUM HYDROXIDE

George M. Armstrong and H Albert Cook, Plymouth Meeting, Pa., assignors to The Philip Carey Manufacturing Company, Cincinnati, Ohio, a corporation of Ohio Application August 15, 1949, Serial No. 110,346

6 Claims. (Cl. 23—67)

Our invention relates to an improved process for the selective carbonation of slurries of calcium and magnesium hydroxide (sometimes containing incompletely hydrated magnesium oxide) for the production of calcium carbonate and magnesium bicarbonate from said hydroxides. This application is a continuation-in-part of our application Serial No. 92,904 filed May 12, 1949, now abandoned.

The foregoing recited steps are usually part of the process of manufacturing various desirable magnesium compounds such as magnesium basic carbonate (MBC), magnesium normal carbonate (MNC), magnesium oxide, sulphate, chloride, and the like for industrial and medicinal purposes.

In the manufacture of hydrated magnesium carbonate (normal or basic) from dolomite, at some step in the process, a mixture of calcium hydroxide and magnesium hydroxide in water suspension is carbonated with carbon dioxide ($CO_2$). The carbon dioxide used is recovered from other stages of processing. Calcium carbonate, which is very insoluble in water, and magnesium bicarbonate which is moderately soluble are the desired end products of the treatment with carbon dioxide. The insoluble calcium precipitate is then separated mechanically by sedimentation in a gravity separator known as a thickener or by means of filtering.

The reaction of forming insoluble calcium carbonate in the carbonation stage liberates heat and this chemical heat tends to promote the formation of a crystalline precipitate of normal magnesium carbonate from the magnesium compounds in the slurry instead of the desired soluble magnesium bicarbonate. Since at a later stage in the process the magnesium bicarbonate is heated and forms, with the liberation of carbon dioxide, either magnesium basic carbonate or magnesium normal carbonate (abbreviated respectively as MBC and MNC), dependent on the temperature and other induced conditions, if during carbonation any normal magnesium carbonate is formed, this product becomes mixed with the calcium carbonate precipitate and requires subsequent processing steps for its recovery. Further, the formation of normal magnesium carbonate tends to deposit as a scale which is difficult to remove from the apparatus.

As an example, if the hydrated magnesium carbonate is to be produced from dolomite rock by the well known Pattinson process, the first step is the calcining of the dolomite rock. Dolomite is essentially an equal molecular mixture of calcium carbonate and magnesium carbonate. In the kiln the rock is burned to convert it into calcium oxide and magnesium oxide. This is called dolomitic lime. The lime is then hydrated with water to form a dilute slurry of calcium and magnesium hydroxides. The calcium hydroxide is slightly soluble in water, but the magnesium hydroxide is substantially insoluble.

When exposed to the action of carbon dioxide in a water suspension the calcium hydroxide is more reactive than the magnesium hydroxide and the chemical reaction generates heat, and it is an object of our invention to control the initial stages of carbonation so as to first convert the calcium hydroxide to calcium carbonate, irrespective of its percentage in the slurry, thereby accomplishing a double purpose in localizing the process where much of the chemical heat is evolved to a position in the apparatus in which the heat may be conveniently dissipated and in avoiding the formation of normal magnesium carbonate induced by the heat of the calcium hydroxide to calcium carbonate reaction, during the saturation step. An unexpected result of the localizing of the initial stages of carbonation is that under controllable relatively high slurry concentration, the relatively high temperatures permitted by said localizing provide a heavy and fast settling calcium carbonate precipitate which may be more quickly and easily separated from the soluble magnesium bicarbonate in much smaller and less expensive equipment than that required when the calcium carbonate is in the finer slower settling form that obtains in the normal commercial forms of the Pattinson process.

It is further an object of our invention to continuously saturate the slurry or mixture of calcium hydroxide and magnesium hydroxide, the continuity of the processing and the controlling of the processing during carbonation permitting a substantially higher recovery in the form of magnesium bicarbonate than has heretofore been possible in carrying out such a saturating process. In our continuous process all of the operating conditions can be maintained under desired conditions, whereas in a batch process, while the desired conditions are reached eventually, this is only after passing through undesirable conditions.

A further object in our continuous process is the recovery of the valuable magnesium salts remaining dissolved in the tailings formed in other steps in the manufacture of hydrated magnesium carbonate and at the same time using the water of the tailings for dilution and lowering the temperature of the slurry being carbonated.

It is further an object to utilize the tailings in such a way as to permit the discharge from the carbonation apparatus of more concentrated magnesium bicarbonate solutions which respond more efficiently under further processing. Tailing liquors are obtained wherever there is a filtration or separation step in which insoluble ingredients are separated from solutions containing soluble salts, and various magnesium salts and carbon dioxide are contained therein which it is one of the purposes of our invention to recover. These tailings may be cooled in a heat exchanger or by other means.

Another object of our continuous processing is to so dilute and leach out the calcium compounds in the slurry continuously delivered to the carbonation cycle that the percentage of calcium compounds originally mixed with the magnesium compounds is materially reduced, thus increasing greatly the recovery of the more valuable magnesium ingredients and otherwise simplifying the carbonation operation.

As a result of the continuous processing, it is our object to complete the carbonation cycle with an exposure of the slurry to substantially pure carbon dioxide gas which has been found to complete the magnesium bicarbonate forming reaction surprisingly effectively so that an actual recovery of upwards of 95% to 98% as magnesium bicarbonate (at a concentration of 3.5% to 4.5% as bicarbonate, −2.26% to 2.9% as MBC) is made possible, whereas by previously known processing a recovery of 90% as magnesium bicarbonate (at a concentration of 2.94% to 3.26% as bicarbonate, 1.90% to 2.10% as MBC) was considered a satisfactory yield.

The foregoing objects and other objects to which reference will be made in the ensuing description we accomplish by that control of the sequence of operations as hereinafter set forth as to which we have illustrated in the figure in the drawing:

A diagram showing schematically an arrangement of apparatus whereby our preferred process may be effectively carried out.

Referring to the diagram, the number 1 indicates the kiln in which, to produce dolomitic lime for use in the Pattinson process, the dolomite rock is calcined. The kiln may hold 200 charges each consisting of 2000 lbs. of dolomite and 155 lbs. of coke. The stone and coke mixture is introduced at the top of the kiln from where it passes progressively downwardly through the preheating zone and into the calcining zone in which the coke is burned to furnish the heat required to convert the stone to dolomitic lime. From the calcining zone, the lime and ash pass down through the cooling zone to the bottom of the kiln, from which it is withdrawn.

From the kiln the lime passes to the crushers in connection with which there may be storage bins. From the crushers the dolomitic lime passes to the slaker 2 where the lime is mixed with enough water to provide a slurry or mixture containing a minimum of seven or more per cent solids consisting of calcium hydroxide and magnesium hydroxide together with impurities from the dolomite rock. As typical of the water used we may use from 3 to 4 lbs. water per 1 lb. of dolomitic oxides in the slaker and an additional 12 lbs. water per 1 lb. dolomitic oxides in the classifier.

We have noted the following concentrations:

At Slaker 3:1 ratio—25% as oxides or 34.0% as hydroxides
At Slaker 4:1 ratio—20% as oxides or 27.2% as hydroxides
At Classifier 15:1 ratio—6.25% as oxides or 8.5% as hydroxides
At Classifier 16:1 ratio—5.8% as oxides or 7.9% as hydroxides Further water is added in another preferred process step to be described.

From the slaker 2 the slurry and mixture of the calcium and magnesium hydroxides may be discharged into the classifier (of conventional type) in which separation of the fine and coarse material takes place thereby purifying the slurry of over-calcined lime, unburned rock, cinders, gravel and other miscellaneous impurities, or this separation may be carried out in a combination slaker and classifier.

The slurry may then be pumped to the saturator, but preferably it is given a further dilution and thickening treatment as will be described. If a separation of the calcium hydroxide from the slurry of magnesium hydroxide is to be effected, the slurry from the classifier or slaker is pumped or flowed to a mixer 4 in which a sufficiently large volume of water or preferably tailings from the calcium carbonate thickener and/or from the filter presses is introduced to cause a substantial percentage (about three-fourths) of the calcium hydroxide to dissolve in the water. The calcium carbonate tailings water is preferred because it is free from $CO_2$ due to its slight alkalinity. The amount of water required for this leaching out operation is roughly 600 parts of water for one part of dolomitic oxides. We have found that if tailings liquor from the process containing small quantities of magnesium carbonate in solution is added to the slurry of calcium and magnesium hydroxide immediately after this stage of the process or in the feed well of the dolomitic lime thickener a floc of magnesium hydroxide $Mg(OH)_2$ forms which enhances the settling of the magnesium and calcium hydroxide sediments and greatly facilitates the subsequent handling in this thickener. It also prevents loss of magnesia in the $Ca(OH)_2$ solution and makes it possible to manufacture pure $CaCO_3$.

From the mixer 4 the dilute slurry is discharged into a thickener 5. A typical thickener is a sedimentation device consisting of a circular settling tank with rotating rakes moving the solids toward a central bottom discharge, the clear liquid overflowing at the upper level.

The sludge or slurry which contains the magnesium hydroxide plus any calcium hydroxide which remains undissolved is continuously discharged at the bottom of the thickener at a concentration of about fifteen per cent solids as hydroxides and is pumped to the saturator, the overflow of weak aqueous solution of calcium hydroxide being pumped to waste or to other stages of processing in which calcium carbonate of a high degree of purity may be recovered.

The saturating or carbonation tank, which is diagrammatically shown, is generally indicated at 6.

The particular carbonation tower diagrammatically shown and which may be about sixty feet high is divided into an upper calcium carbonation zone indicated at A, intermediate carbonation zones B, C, D, for carbonating the magnesium hydroxide and other salts, and a bottom supercarbonating zone E where substantially pure carbon dioxide is used to complete the formation of magnesium bicarbonate.

The division of the tower into the different zones referred to may be effected by provision of perforated horizontally disposed plate sections having a discharge conduit to the zone below. The plate sections substantially completely fill in the area sectionally across the tower. The plates are perforated to permit a restricted flow of carbon dioxide gas upwardly through the plates; the downward flow of the slurry through the discharge conduits preventing substantial flow of carbon dioxide gas up through the conduits. The result of such construction, as the rising currents of carbon dioxide containing gases are held back by the restricted orifices in the perforated plates, is to build up gas pockets under each plate. The perforated plates prevent short circuiting of the gas and liquid flows. If too active carbonation is taking place in zone A, a series of interconnecting bypass gas lines 7 are provided which permit bypassing a portion of the carbon dioxide gas trapped in the pocket below the top plate, or such recirculation as may be necessary.

The levels of the slurry being carbonated are indicated at predetermined levels within each zone as indicated by cross shading at A1, B1, C1, D1 and E1. Above the levels of liquid the unshaded area between the top line of the liquid and the perforated horizontal baffles above the liquid levels indicates the gas pockets.

In zone D there is indicated at 8 a gas disperser through which conveniently about an 8% to 50% carbon dioxide concentration of gas, typically about 30% of $CO_2$, is introduced at about 20 lb. per square inch pressure. This gas may be recovered from the calcining stage in the kilns. The latter gas contains in addition to carbon dioxide, about 70% nitrogen and other gases, but may be enriched by addition of more concentrated $CO_2$ containing gas, if desired.

In zone E there is indicated at 9 a gas disperser (which may be a perforated drilled or slotted pipe; a nozzle; a porous metal or stone; mechanical devices such as turbines or propellers, etc.) through which substantially pure carbon dioxide is introduced. This may be under about 25 lb. per square inch pressure. This gas is preferably that recovered from the decomposition of the magnesium bicarbonate at later stages in the processing. If desirable it may be recirculated from the gas pocket at the top of the zone by an independent compressor (not shown) back into the bottom of the zone through the nozzle 9. Any excess of pure $CO_2$ may be used to enrich the kiln gases.

At the various levels in the tower sampler tubes 10 are provided through which samples of the slurry passing down through the tower may be taken for analysis. At X is shown a level control chamber having a float which regulates the discharge valve from the tower to maintain a constant level at A1. At 11 is shown a pipe through which either water or tailings liquor may be introduced into zone B to cool and dilute the slurry below the zone A where a large amount of the chemical heat is evolved.

The equipment diagrammatically shown may be varied to suit particular requirements. For example, instead of zones B, C, D, these may be combined in a single zone. As stated, the horizontal baffle plates have perforations which restrict the flow of the upwardly rising gas and redisperse it.

As has been stated, it is our object to carbonate substantially completely and convert to calcium carbonate the calcium hydroxide in the slurry in the top zone A. Whether this is being accomplished in this zone can be readily determined by sampling the slurry at the bottom of zone A. If analysis shows that magnesium normal carbonate is being formed in zone A, gas from between the top baffle and level B1 is bypassed to above the liquid level in zone A, thus decreasing the amount of gas bubbling up through the slurry above the perforated plate. Precarbonation can be controlled also by varying the liquid level in zone A. The efficiency of gas absorption can be reduced by using a smaller number of larger holes in the plate or by reducing the number of holes sufficiently to force part of the gas through the discharge conduits as very large bubbles.

In our preferred step of leaching out the calcium hydroxide prior to carbonation the percentage of calcium hydroxide present is reduced by about seventy-five per cent. The combined hydroxides in the slurry fed continuously to the tower contain less than about twenty-five per cent calcium hydroxide by weight to start with, since the total $Ca(OH)_2$ content of the slurry is maintained at about 3% by weight, and since the temperature of the feed is controlled at about 80° F., the chemical heat evolved in the presaturating zone should not cause a rise in temperature to higher than about 120° F. An example of the concentrations to be obtained is as follows:

|  | Comp. of Solids in Washed Lime | | | Composition of Feed Slurry to Tower | | | |
| --- | --- | --- | --- | --- | --- | --- | --- |
|  | | | | Equiv. MBC | | As Hydroxides | |
|  | Mols. | Lbs. | Percent | Lbs. | Percent | Lbs. | Percent |
| $Mg(OH)_2$ | 1.00 | 58.34 | 76 | 94.4 | 15 | 58.34 | 9.54 |
| $Ca(OH)_2$ | 0.25 | 18.52 | 24 |  |  | 18.52 | 3.03 |
| Water |  | 76.86 | 100 | 534 | 85 | 534 | 87.43 |
| Total Slurry |  |  |  | 629 | 100 | 611 | 100.00 |

The efficiency of gas absorption in the tower is such that practically all of the $CO_2$ can be absorbed from gas when no excess is available.

It is an advantage in our process that substantially all the calcium hydroxide in zone A may be carbonated, so that it will not react with the magnesium carbonate tailings in zone B or in any subsequent zone, to form undesirable magnesium normal carbonate (MNC). Since this step of the process is confined to the top of the tower, the heat will more readily be dissipated. If necessary in hot summer weather the liquid may be circulated through a heat exchanger cooled with water. Sprays in the top of the tower wash down foam and splashed solids from the inside walls of zone A.

In any event the sludge, passing down through the conduit from zone A into zone B is immediately met by a stream of cool water or tailings liquor which cools the slurry down to below the danger point for the formation of normal magnesium carbonate, and to the best conditions for the formation of magnesium bicarbonate solution of desired high concentration. It is advantageous to add the tailings to the precarbonated lime in the presence of an excess of $CO_2$. If no $CO_2$ were present, the $Mg(OH)_2$ from A would convert the bicarbonate in the tailings to normal carbonate, and the latter would require relatively strong $CO_2$ to reconvert it to bicarbonate.

In zones B, C and D the formation of magnesium bicarbonate from the magnesium hydroxide proceeds in stages. The carbon dioxide gas of intermediate concentration at the nozzle 8 gradually decreases in strength and pressure as it bubbles upwardly so that a fairly even rate of carbonation occurs during the passing of the slurry down through the tower. Since both strength and pressure of the $CO_2$ are controlling factors, we may use the term "partial pressure" to indicate the effective pressure of $CO_2$ irrespective of whether this is brought about by pressure or concentration.

We have found that once the calcium carbonate has been formed from the calcium hydroxide in the slurry the gradual carbonation of the magnesium hydroxide with controlled temperature due to dilution in zone B and the gradual carbonation in successive stages as the slurry moves downwardly through the zones of the tower avoids the formation of other than magnesium bicarbonate.

As the slurry passes down into zone E it meets an upwardly rising current of substantially pure carbon dioxide which results in a yield, as the slurry passes out through the discharge at the bottom of the tower, of as high as 95% to 98% as previously defined of magnesium bicarbonate formed from the total available magnesium salts present in the feed to the tower. The non-absorbed carbon dioxide gas bubbling up through the perforated plate separating zone E and zone D may be mixed with the weaker carbon dioxide gas introduced through the nozzle 8, or it may be taken off from underneath the plate and recirculated through zone E.

From the discharge, as controlled by the float in the constant level tank X, the slurry passes to a thickener or filter 12 in which the calcium carbonate precipitate is separated out in the usual manner, the magnesium bicarbonate solution containing as high a percentage of bicarbonate as from 3.5 to 4.5 per cent, corresponding to 2.26 to 2.90% as MBC. Under previously known processes the average concentration of bicarbonate has rarely exceeded 2.94 per cent, 1.90% as MBC. By keeping this final thickener, and the pipe lines, pumps, meters and heat exchangers under an absolute pressure of about one atmosphere of carbon dioxide, the decomposition to normal carbonate which, as a precipitate, would be mixed with the calcium carbonate precipitate, is avoided.

While we have recited certain temperatures, pressures, and concentrations as suitable, it should be understood that the advantages of the new steps which we have described for the selective carbonation of slurries of calcium and magnesium hydroxides in a continuous process are afforded within a wide range of changes in conditions. It should be noted that in the claims which follow the statement that the slurry is composed primarily of magnesium and calcium hydroxides includes such incompletely hydrated magnesium oxide as may be present, even to the extent in some cases where the slurry contains relatively high percentages of unhydrated MgO.

Having thus described our process, what we claim as new and desire to secure by Letters Patent is:

1. In the manufacture of highly concentrated magnesium bicarbonate solution from a slurry formed from the substantially complete calcination of dolomite and composed primarily of a mixture of magnesium and calcium hydroxides, a continuous sequence of carbonation steps in a series of zones including the steps of carbonating to calcium carbonate substantially only the calcium hydroxide of the slurry in the first of said zones, passing the partially carbonated slurry to the second of said zones, cooling and diluting the partially carbonated slurry by mixing therewith aqueous tailings containing magnesium salts and carbon dioxide, and gradually carbonating the slurry being passed through said second zone with a gas containing from 8 to 50% of carbon dioxide, thereby minimizing the formation of normal magnesium carbonate.

2. In the manufacture of highly concentrated magnesium bicarbonate solution from a slurry formed from the substantially complete calcination of dolomite and composed primarily of a mixture of magnesium and calcium hydroxides, a continuous sequence of carbonation steps in a series of zones including the steps of carbonating to calcium carbonate substantially only the calcium hydroxide of the slurry in the first of said zones, passing the partially carbonated slurry to the second of said zones, cooling and diluting the partially carbonated slurry by mixing therewith aqueous tailings containing magnesium salts and carbon dioxide, gradually carbonating the slurry being passed through said second zone with a gas containing from 8 to 50% of carbon dioxide, thereby minimizing the formation of normal magnesium carbonate, continuously passing the gradually carbonated slurry into a third zone, and carbonating the slurry with substantially pure carbon dioxide to form a highly concentrated magnesium bicarbonate solution.

3. In the manufacture of highly concentrated magnesium bicarbonate solution from a slurry formed from the substantially complete calcination of dolomite and composed primarily of a mixture of magnesium and calcium hydroxides, a continuous sequence of carbonation steps in a series of zones including the steps of carbonating to calcium carbonate substantially only the calcium hydroxide of the slurry in the first of said zones, passing the partially carbonated slurry to the second of said zones, cooling and diluting the partially carbonated slurry by mixing therewith aqueous tailings containing magnesium salts and carbon dioxide, gradually carbonating the slurry being passed through said second zone with a gas containing from 8 to 50% of carbon dioxide, thereby minimizing the formation of normal magnesium carbonate, continuously passing the gradually carbonated slurry into a third zone, carbonating the slurry with substantially pure carbon dioxide to form a highly concentrated magnesium bicarbonate, and separating the sludge of calcium carbonate from the magnesium bicarbonate solution while maintaining said solution and sludge under a pressure of carbon dioxide, thereby minimizing the formation at this separating stage of normal magnesium carbonate.

4. In the manufacture of highly concentrated magnesium bicarbonate solution from a slurry composed primarily of a mixture of magnesium and calcium hydroxides formed from the substantially complete calcination of dolomite, a continuous sequence of carbonation steps in a series of zones including the steps of carbonating to calcium carbonate substantially only the calcium hydroxide of the slurry in the first of said zones, passing the partially carbonated slurry to the second of said zones, cooling and diluting the partially carbonated slurry by mixing therewith aqueous tailings containing magnesium salts and carbon dioxide, gradually carbonating the slurry being passed through said second zone with a gas containing from 8 to 50% of carbon dioxide, thereby minimizing the formation of normal magnesium carbonate, continuously passing the gradually carbonated slurry into a third zone, carbonating the slurry with substantially pure carbon dioxide to form a highly concentrated magnesium bicarbonate solution, separating the sludge of calcium carbonate from the magnesium bicarbonate solution while maintaining said solution and sludge under a pressure of carbon dioxide, thereby minimizing the formation at this separating stage of normal magnesium carbonate, passing the slurry to a thickener for separating out the calcium carbonate and maintaining an absolute pressure of about one atmosphere of carbon dioxide on this final thickener and the pipe lines, pumps, meters and heat exchangers thereby preventing the decomposition of the magnesium bicarbonate to normal magnesium carbonate.

5. In the manufacture of highly concentrated magnesium bicarbonate solution from a slurry composed primarily of a mixture of magnesium and calcium hydroxides formed from the complete calcination of dolomite, a continuous process comprising the steps of leeching out of said mixture a substantial proportion of said calcium hydroxide, subjecting said leeched out slurry to a continuous sequence of carbonating steps in a series of zones including the steps of carbonating to calcium carbonate substantially only the calcium hydroxide of the slurry in the first of said zones, passing the partially carbonated slurry to the second of said zones, cooling and diluting the partially carbonated slurry by mixing therewith aqueous tailings containing magnesium salts and carbon dioxide, and gradually carbonating the slurry being passed through said second zone with a gas containing from 8 to 50% of carbon dioxide, thereby minimizing the formation of normal magnesium carbonate.

6. In the manufacture of a highly concentrated magnesium bicarbonate solution from a slurry composed primarily of a mixture of magnesium and calcium hydroxides formed from the substantially complete calcination of dolomite, a continuous process comprising the steps of adding to said slurry a small amount of tailings water containing soluble magnesium salts, thereby forming flocs of magnesium hydroxide which facilitate sedimentation of the solids in said slurry and clarification of the calcium hydroxide solution, withdrawing the clarified calcium hydroxide solution and subjecting the remaining fraction of said slurry to a sequence of carbonating steps in a series of zones including the steps of carbonating to calcium carbonate substantially only the calcium hydroxide of the slurry in the first of said zones, passing the partially carbonated slurry to the second of said zones, cooling and diluting the partially carbonated slurry by mixing therewith aqueous tailings containing magnesium salts and carbon dioxide, and gradually carbonating the slurry being passed through said second zone with a gas containing from 8 to 50% of carbon dioxide, thereby minimizing the formation of normal magnesium carbonate.

GEORGE M. ARMSTRONG.
H ALBERT COOK.

REFERENCES CITED

The following references are of record in the file of this patent:

UNITED STATES PATENTS

| Number | Name | Date |
|---|---|---|
| 2,084,588 | Miller | June 22, 1937 |
| 2,386,027 | Wing | Oct. 2, 1945 |
| 2,390,095 | Gloss | Dec. 4, 1945 |
| 2,394,863 | Lundin | Feb. 12, 1946 |
| 2,442,481 | Baker | June 1, 1948 |
| 2,449,293 | Gloss | Sept. 14, 1948 |

FOREIGN PATENTS

| Number | Country | Date |
|---|---|---|
| 548,197 | Great Britain | Sept. 30, 1942 |